Nov. 29, 1960 R. HEINEMANN 2,962,143
CLUTCH OR BRAKE
Filed May 20, 1957

INVENTOR.
Rolf Heinemann
BY Michael S. Striker
agt.

United States Patent Office 2,962,143
Patented Nov. 29, 1960

2,962,143
CLUTCH OR BRAKE

Rolf Heinemann, Stuttgart-Zuffenhausen, Germany, assignor to Firma Georgii Elektro-Motoren-Apparatebau-Kommanditgesellschaft, Stuttgart, Germany Filed May 20, 1957, Ser. No. 660,190

Claims priority, application Germany May 19, 1956

8 Claims. (Cl. 192—84)

The present invention relates to devices such as clutches or brakes wherein a pair of parts are releasably held together immovably with respect to each other.

Where devices of this type are electromagnetically actuated, so that the force holding the pair of parts together immovably requires a source of electricity, there is a danger that the brake or clutch will become disengaged when there is a power failure, and for this reason such devices are not safe. On the other hand, where springs are relied upon for holding the clutch or brake members immovably together, and an electromagnet is used for disengaging the clutch or brake, the device is safe but it is not efficient because the force of the electromagnet is required to overcome the spring force.

One of the objects of the present invention is to provide a device of the above type which does not rely upon any outside source of power to hold the parts thereof immovably together, so that the structure will not fail to operate if there is a failure in the power supply.

Another object of the present invention is to provide a device of the above type which does not require springs to hold its parts immovably together when the device is engaged.

A further object of the present invention is to provide a device of the above type whose parts may be disengaged so as to be movable with respect to each other without the use of any electromagnetic means.

An additional object of the present invention is to provide a device of the above type with a magnetic circuit arrangement capable of making and breaking a magnetic circuit with a relatively small mechanical force.

It is also an object of the present invention to provide structure capable of accomplishing the above objects and at the same time made of simple and ruggedly constructed elements which are very reliable in operation.

With the above objects in view, the present invention mainly consists of a device for releasably holding a pair of parts immovably together, such as a clutch or brake, this device including a first member and a second member located adjacent each other and a support means supporting the first member for movement to an engaged position where the first and second members are immovable with respect to each other and to a disengaged position where the first and second members are movable with respect to each other. A magnetic circuit means is carried in part by the first member and in part by the second member, and this magnetic circuit means includes an element shiftably carried by one of the members for movement between an operating position where the shiftable element closes the magnetic circuit so that the latter moves the first member to its engaged position when the shiftable element is in its operating position and an inoperative position spaced from the remainder of the magnetic circuit means so as to cause the lines of force thereof to collapse to free the first member for movement to its disengaged position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
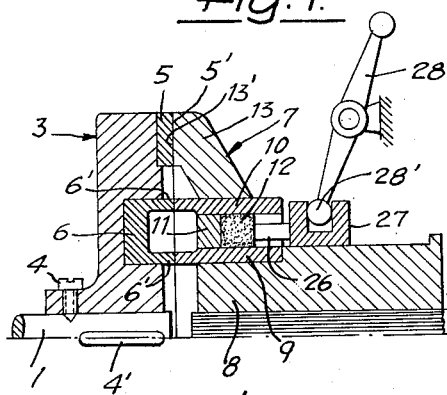
Fig. 1 is a sectional, elevational view showing the upper portion only of one possible embodiment of the device according to the present invention.

Referring to Fig. 1, the structure illustrated therein is a clutch, although it will be readily understood by those skilled in the art that the invention is applicable without any difficulty to a brake. The clutch of Fig. 1 includes a pair of coaxial shafts 1 and 2. The shaft 1 fixedly carries a clutch member 3 which is fixed to the shaft 1 by set screws 4 or the like and which has tongues respectively extending into grooves 4' formed on the shaft 1, so that in this way the clutch member 3 is constrained to rotate with the shaft 1 and is immovable with respect to the latter. Adjacent its outer periphery and at its right face, as viewed in Fig. 1, the clutch member 3 fixedly carries a friction ring 5 forming part of the clutch member 3 and made of any suitable material having a coefficient of friction, such as a brake lining material. The clutch member 3 is of circular configuration and is coaxial with the shaft 1, and the annular ring 5 which is fixed to the clutch member 3 also is coaxial with the shaft 1. The clutch member 3 is preferably made out of a non-magnetic material, and is formed in its right face, as viewed in Fig. 1, with an annular groove coaxial with the shaft 1 and having an annular channel 6 of substantially U-shaped cross section located therein and fixed to the member 3, the channel 6 being made of soft iron and being coaxial with the shaft 1.

The shaft 2 carries a clutch member which is designated in its entirety by the reference character 7. This clutch member 7 includes a hub 8 carried by the shaft 2 for rotation therewith but being axially shiftable with respect to the shaft 2 which is itself capable of rotating about its axis, but not capable of shifting along its axis. For example, the hub 8 may have a splined connection with the shaft 2. The hub 8 has a cylindrical outer surface to which is fixed a cylindrical ring 9 made of soft iron, and a ring 11 of a non-magnetic material is fixed to the outer surface of the ring 9 and has fixed to its outer cylindrical surface a second cylindrical ring 10 made of soft iron, the rings 9 and 10 being coaxial with the shaft 2 and defining at the right of the ring 11 an annular space in which a permanent magnet 12 in the form of a ring is axially shiftable while slidably engaging the rings 9 and 10. The channel 6 and the rings 9, 10 and 12 form a magnetic circuit means for moving the clutch member 7 to the engaged position thereof which is illustrated in Fig. 1. The clutch member 7 includes a ring 13 fixed to the outer surface of the ring 10 and having a left annular friction face 13' which engages the right annular friction face 5' of the friction ring 5 for causing the members 3 and 7 to be held together immovably with respect to each other.

The permanent magnet 12 has its lines of force directed radially toward the axis of the shaft 2, and an unillustrated mechanical means cooperates with the ring 12 for shifting the latter axially from the position shown in Fig. 1 to the right to a rest or inoperative position where the ring 12 is located outside of the space between the rings 9 and 10 in engagement with the outer surface of the hub 8. This mechanical means for shifting the ring 12 may take the form of a plurality of pins 26 distributed about the axis of the ring 12 and fixed to and extending from the right face thereof, as viewed in Fig. 1. The pins 26 have ends located distant from the ring 12 and fixed to a grooved ring 27. The ball shaped end 28' of a double armed lever 28 engages in the groove of ring 27, so that this lever may be actuated to shift the ring 27 together with the pins 26 and the ring 12 to the right or left, as viewed in Fig. 1.

The rings 9 and 10 are respectively of the same diameter as the inner and outer annular sides of the channel 6, and the arrangement is such that the rings 9 and 10 respectively form extensions of the sides of the channel 6 and engage these sides when the clutch is engaged so that the lines of magnetic force flow directly between the channel 6 and the rings 9 and 10 when the clutch is engaged. As can be seen from Fig. 1, the clutch member 3 and the brake member 7 have end faces facing each other and portions of these end faces, that is the annular friction face 13', the left end annular attracting faces of rings 9 and 10 of the brake member 7 and the annular friction face 5' of ring 5 and the right end annular attracting faces of channel 6 of the clutch member 3 engage each other, and thus when the clutch is engaged a magnetic circuit practically without any air gaps is provided for the lines of force of the permanent magnet 12.

In accordance with the present invention the rings 9 and 10 extend to the right beyond the permanent magnet 12, as viewed in Fig. 1, through a predetermined distance. This distance is at least as great as the distance between the engaged position of member 7 when the clutch is new and the engaged position of the member 7 when the lining 5 is practically worn out. Thus, during the entire life of the ring 5 the permanent magnet 12 will always be located in its entirety between the rings 9 and 10 whenever the clutch is engaged so that the desired magnetic circuit will be produced without any further adjustments during wear of the clutch. Of course, as the clutch becomes worn the ring 12 will no longer engage the ring 11 when the ring 12 is in its operating position, but nevertheless the ring 12 will always be located in its entirety in the space between the rings 9 and 10 whenever the clutch is engaged. Thus, the full magnetic force is guaranteed during wear of the clutch.

In order to limit axial shifting of the clutch member 7, the shaft 2 fixedly carries a stop ring 14 spaced to the right of the hub 8 when the clutch is engaged as shown in Fig. 1. When the clutch is disengaged the member 7 is capable of shifting to the right, as viewed in Fig. 1, until the hub 8 engages the ring 14.

In order to engage the clutch of Fig. 1 the permanent magnet 12 is shifted into the space between the rings 9 and 10 toward the ring 11. The lines of magnetic force of the permanent magnet are now conducted along a closed circuit by elements 9, 10 and 6. The magnetic pull provided in this way causes the rings 9 and 10 to be pulled to the ring 6. At the same time the clutch member 7 is axially shifted on the shaft 2 so that the surface 13' engages the friction ring 5 in order to engage the clutch.

In order to disengage the clutch the permanent magnet 12 is simply shifted out of the space between the rings 9 and 10. This causes the magnetic field in the soft iron rings 9, 10 and 6 to collapse so that the pull of the member 7 toward the member 3 ceases. There remains at most a practically insignificant pulling force between the clutch elements as a result of the residual magnetism of the soft iron rings. This force is not sufficient, however, to provide the necessary frictional engagement between the surface 13' and the ring 5, so that the clutch is released by movement of the permanent magnet 12 in the described manner.

Figure 2:
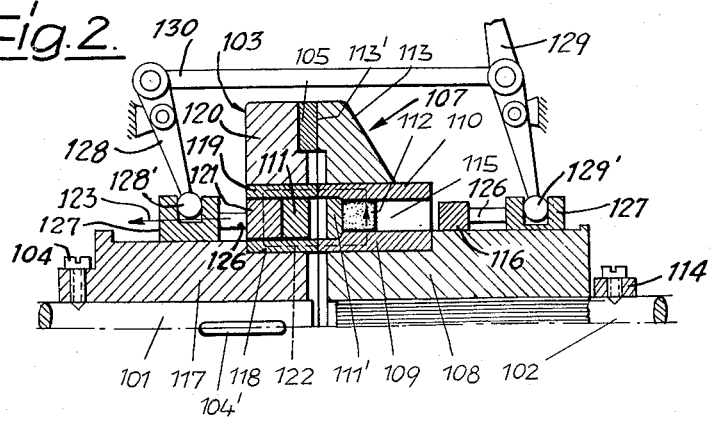
Fig. 2 is a sectional, elevational view showing only the upper portion of a second embodiment of a device according to the present invention.

Fig. 2 shows another embodiment of the invention wherein those parts which correspond to the parts of Fig. 1 are indicated with the same reference characters increased by 100.

The shafts 101 and 102 of the clutch of Fig. 2 are coaxial with each other and the clutch members 103 and 107 are respectively carried by these shafts, the clutch member 103 being fixed to the shaft 101 in the above described manner while the clutch member 107 is axially shiftable on the shaft 102 but is constrained to rotate therewith.

This clutch member 107 also includes a hub 108 and a pair of soft iron rings 109 and 110, but with the embodiment of Fig. 2 the permanent magnet 112 is permanently fixed between the rings 109 and 110. The member 107 has an outer ring 113 provided with a surface 113' which engages the friction ring 105 carried by the clutch member 103. The fixing of the permanent magnet 112 to the rings 109 and 110 is in contrast to the embodiment of Fig. 1 where the permanent magnet is shiftable.

With the embodiment of Fig. 2, the rings 109 and 110 form in a manner similar to the embodiment of Fig. 1 a space 115 in which a ring is shiftable, the outer surface of the inner ring 109 being flush with and forming an extension of the outer cylindrical surface of the hub 108 located to the right of the ring 109, as was the case with Fig. 1. The outer cylindrical surface of the ring 109 and the outer cylindrical surface of the ring 108 serve to slidably support a soft iron ring 116 which is shiftable mechanically into and out of the space 115 with a structure similar to that described above in connection with the permanent magnet 12. The permanent magnet 112 is magnetized so that its lines of force extend radially toward the axis of the shaft 102, and thus the magnetic circuit is completed when the clutch is engaged in the manner shown by the dotted line in Fig. 2, this circuit flowing from the permanent magnet 112 through the rings 109 and 110. In the event that the permanent magnet 112 is made of a material which is not strong enough to withstand the mechanical stresses of the clutch, then the rings 109 and 110 are also fixed to the ring 111' which is made of a non-magnetic material, so that in this way the mechanical load on the ring 112 is reduced.

Similarly to the clutch part 107, the clutch part 103 includes a hub 117, this hub being fixed to the shaft 101 by the screws 104 and by tongues extending into the grooves 104' of the shaft 101. The member 103 also includes a pair of soft iron cylindrical rings 118 and 119 held together by a non-magnetic ring 111. The cylindrical outer surface of the ring 119 has fixed thereto the ring 120 which directly carries the friction ring 105. The two soft iron rings 118 and 119 form together with the ring 111 an annular bearing, corresponding to the bearing 115 for a soft iron ring 121 shiftable into and out of the space between the rings 118 and 119, the hub 117 having an outer cylindrical surface which forms an extension of the outer cylindrical surface of the ring 118. The rings 118 and 119 which are coaxial with the shaft 101 have the same diameters as the rings 109 and 110, respectively, and they are so arranged that their end faces which are directed toward each other abut against each other when the clutch is engaged, as shown in Fig. 2.

In order to concentrate the magnetic lines of force in the soft iron rings, the parts 108, 113, 117, and 120 are made of a non-magnetic material. In a manner similar to Fig. 1, the shaft 102 carries a stop ring 114 for limiting the movement of the clutch member 107 to its disengaged position.

The embodiment of Fig. 2 presents two distinct possibilities for controlling the clutch, and these two possibilities may be used separately or they may be simultaneously operated. In the position of the parts shown in Fig. 2 the rings 116 and 121 are so positioned that the magnetic circuit flows along the dotted line of Fig. 2 through the pairs of soft iron rings, the permanent magnet 112, and the soft iron ring 121. This causes the clutch to be engaged. It is possible to disengage the clutch by shifting the ring 116 into the space 115. This ring 116 thus forms a short circuit element which when it is located in the space 115 short circuits the magnetic lines of force to cause the magnetic circuit to flow through the ring 116 so that practically no lines of force reach the soft iron rings 118 and 119, and thus, the magnetic force pressing the member 107 toward the member 103 ceases. The same result can be obtained, however, by leaving the ring 116 in the illustrated position and shifting the ring 121 to the left in the direction of arrow 123 of Fig. 2 so that the ring 121 is moved out of the space between the rings 118 and 119, and thus the magnetic circuit collapses. A particularly effective elimination of the force moving the member 107 toward the member 103 is provided by shifting both of the rings 116 and 121 simultaneously in the direction of the arrow 123. The ring 121 as well as the ring 116 may be shifted mechanically by a structure as described above in connection with the permanent magnet 12. Pins 126 are attached at the inner ends thereof respectively to rings 116 and 121 and these pins carry at the outer ends thereof respectively grooved rings 127, which are respectively engaged by the ball shaped ends 128', 129' of double-armed levers 128, 129. Levers 128, 129 may be connected together by a connecting rod 130 for simultaneous movement. It will be noted that with the above-described structures the shiftable rings are always moved in a direction perpendicular to the lines of force so that a relatively small mechanical force is required to make and break the magnetic circuit.

Figure 3:
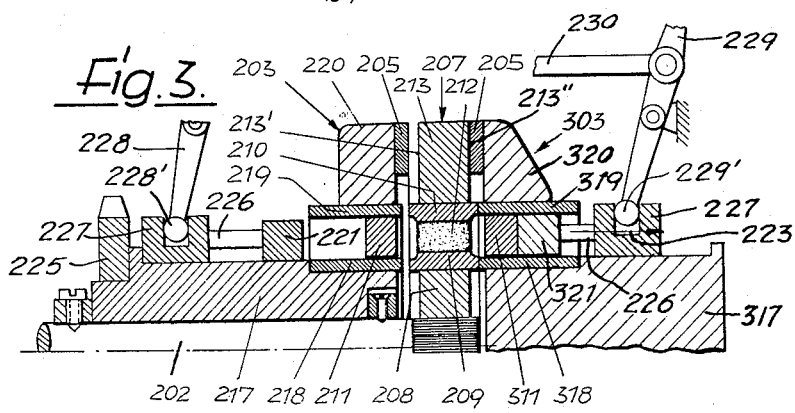
Fig. 3 is a sectional, elevational view showing only the upper portion of a third embodiment of a device according to the present invention.

The embodiment of Fig. 3 shows a device capable of acting as a brake as well as a clutch. Those parts of the structure of Fig. 3 which correspond to the embodiment of Fig. 1 are indicated with the same reference characters increased by 200, and the parts which correspond to the elements of the embodiment of Fig. 2 are indicated by the same reference characters as those of Fig. 2 increased by 100.

A clutch member which is indicated in its entirely with the reference character 207 is carried by the shaft 202 for rotation therewith, but is capable of shifting axially with respect to the shaft 202. At the left side of the clutch member 207 the shaft 202 carries a second clutch member 203 which is freely rotatable on the shaft 202 but which is incapable of shifting axially with respect to the shaft 202. For example, collars fixed to the shaft 202 may be placed respectively in engagement with the end faces of the clutch member 203 to prevent axial shifting of the latter while permitting free rotation thereof with respect to the shaft 202. The clutch member 203 has a gear 225 fixed thereto so that this clutch member may be driven about the axis of the shaft 202 by any drive cooperating with the gear 225. At the side of the clutch element 207 opposite from the clutch element 203 there is a stationary brake member indicated in its entirely by the reference character 303, this brake member 303 being fixedly mounted on a stationary machine part 317, for example.

The clutch member 203 includes a hub 217 and a pair of soft iron rings 218 and 219 held together by a nonmagnetic ring 211, all of these parts being fixed to each other so that the rings 218 and 219 turn together with the hub 217. A ring 220 made of a non-magnetic material is fixed to the outer surface of the soft iron ring 219 and fixedly carries a friction ring 205. A soft iron ring 221 is axially shiftable along the outer cylindrical surface of the hub 217 and along the outer cylindrical surface of the soft iron ring 218, this ring 221 being shiftable into and out of the space between the rings 218 and 219 by any suitable mechanical structure such as that described above in connection with the permanent magnet 12.

In a similar manner, the brake member 303 includes the stationary machine part 317 which has an outer cylindrical surface, the pair of soft iron rings 318 and 319 which are fixed together by the interposed nonmagnetic ring 311, the ring 318 being fixed to the member 317, and a ring 320 fixed to the outer surface of the ring 319 and carrying a friction ring 205, the latter ring being directed toward the clutch member 207. The rings 318 and 319 define between themselves an annular space into and out of which a soft iron ring 321 is shiftable, this ring 321 being slidable on the outer cylindrical surface of member 317 which is located beyond and forms an extension of the outer cylindrical surface of the ring 318.

The clutch member 207 includes an inner hub 208, the pair of soft iron rings 209 and 210 which are held together by the permanent magnet ring 212 located between the rings 209 and 210, the ring 209 being fixed to the hub 208, and the clutch member 207 includes an outer ring 213 made in the same way as the hub 208 of a nonmagnetic material and being fixed to the outer cylindrical surface of the ring 210. The ring 213 has a left surface 213' which cooperates with the friction ring 205 of member 203 and a right surface 213'' cooperating with the friction ring 205 of the member 303. The rings 218, 209 and 318 are of the same diameter and are coaxial, while the rings 219, 210 and 319 are also of the same diameter and coaxial with each other, so that all of these rings form extensions of each other, and the end surfaces of the several pairs of rings which are directed towards each other are so arranged that the end surfaces of two of the three pairs of rings abut against each depending upon the position of the parts.

In the position of the rings 221 and 321 shown in Fig. 3, the lines of force of the permanent magnet 212 form a closed circuit through the rings 210, 319, 321, 318 and 209, and thus the member 207 is pulled by the magnetic circuit toward the brake member 303 to be held immovable with respect thereto, and thus the shaft 202 is braked and prevented from rotating. If at this time the member 203 is rotated by a drive connected to the gear 225, it will simply turn about the shaft 202 freely without transferring any rotation to the shaft 202.

If the two rings 221 and 321 are both shifted simultaneously in the direction of the arrow 223 of Fig. 3, then the magnetic circuit through the brake member 303 collapses and a different magnetic circuit is completed through the rings 219, 221 and 218 of the member 203. Thus, the clutch member 207 will be pulled to the clutch member 203 so that the clutch becomes engaged and the shaft 202 is now rotated together with the clutch member 203. The rings 221 and 321 can be axially shifted with a structure such as that described above in connection with the permanent magnet 12. Pins 226 are attached at their inner ends thereof respectively to rings 221 and 223 and these pins carry at their outer ends respectively grooved rings 227, which are respectively engaged by the ball shaped ends 228', 229' of double-armed levers 228, 229. Levers 228, 229 may be connected by a connecting rod 230 for simultaneous movement.

The embodiment of the invention which is illustrated in Fig. 3 can be varied so that the permanent magnet is in the form of a shiftable ring or a connecting ring between the soft iron rings of the members 203 or 303, and in this case the rings 209 and 210 of element 207 would be connected together to form a single soft iron ring.

The above described embodiments of the invention can also be applied to clutches or brakes having several alternating laminations associated with the pair of clutch or brake members.

With the embodiment of Fig. 3 the magnetic lines of force of the permanent magnet 212 are also directed radially toward the axis of the shaft 202, so that in this embodiment the rings 221 and 321 also are shifted in a direction perpendicular to the lines of magnetic force, and thus a relatively small mechanical force is required to operate the device.

However, all embodiments of the invention can be provided, if desired, with permanent magnets having axially extending lines of force, and of course the magnetically conductive elements associated with the permanent magnet to form part of the magnetic circuit must be correspondingly changed.

Figure 4:
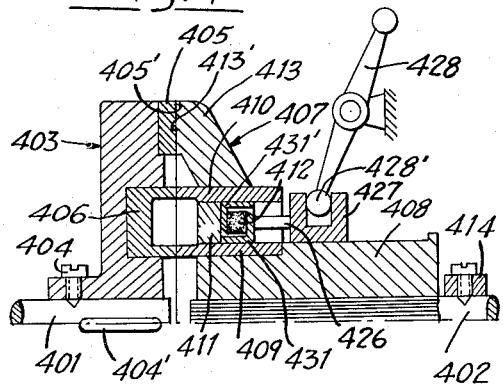
Fig. 4 is a sectional, elevational view showing only the upper portion of a fourth embodiment of a device according to the present invention.

Such a modification is shown in Fig. 4. The clutch construction as shown in Fig. 4 is very similar to the construction as shown in Fig. 1 and the parts of the embodiment shown in Fig. 4 which correspond to the parts of Fig. 1 are indicated with the same reference characters increased by 400. The shafts 401 and 402 of the clutch of Fig. 4 are coaxial with each other and the clutch members 403 and 407 are respectively carried by these shafts, the clutch members 403 being fixed to the shaft 401 by a set screw 404 and a key 404', while the clutch member 407 is axially shiftable on the shaft 402 but is constrained to rotate therewith. The clutch member 403 includes also a friction ring 405, made for instance of brake lining material, and an annular channel 406 of substantially U-shaped cross section located in an annular groove formed in the clutch member 403 coaxial with the shaft 401. The channel 406 is made of soft iron whereas the remaining parts of the clutch member 403 are preferably made out of non-magnetic material.

The clutch member 407 includes a hub 408 carried by the shaft 402 for rotation therewith. The hub 408 has a cylindrical outer surface to which a cylindrical ring 409 made of soft iron is fixed, and a ring 441 of non-magnetic material is fixed to the outer surface of ring 409 and has fixed to its outer cylindrical surface a second cylindrical ring 410 made of soft iron. The rings 409 and 410 are coaxial with the shaft 402 and define at the right of the ring 411 an annular space. Located in this annular space is a ring 431' of L-shaped cross section the outer faces of which are respectively attached to the rings 410 and 411. The leg of the ring 431' attached to the ring 411 is engaged by a permanent magnet 412 in ring form whereas the other leg of the L-shaped ring 431' is spaced from the magnet ring 412. The magnet ring 412 is carried by a second ring of L-shaped cross section 431 which engages and is fixed with one leg thereof to the magnet ring 412 whereas the other leg of the L-shaped ring 431 is in slidable engagement with the ring 409 and is spaced from the magnet ring 412. The clutch member 407 includes also a ring 413 fixed to the outer surface of the ring 410 and having a left annular friction face 413' which engages the right annular friction face 405' of the friction ring 405 for causing the members 403 and 407 to be held together immovably with respect to each other.

In this embodiment the lines of force of the permanent magnet 412 will therefore extend in axial direction of the axis of the shaft. Means are also provided which cooperate with ring 431 and the magnet 412 attached thereto for shifting the latter axially from the position shown in Fig. 4 to the right to a rest or inoperative position where the ring 412 is located outside the space between the rings 409 and 410 in engagement with the outer surface of the hub 408. These means are of similar construction as shown in Fig. 1 and comprise a plurality of pins 426 fixed at one of the ends thereof to the ring 431 and at the other end thereof to a grooved ring 427 which slides on the outer surface of the hub 408 and which is engaged by the ball-shaped end 428 of a double-armed lever 428 so that tilting of this lever will shift the ring 427 and therewith the magnet ring 412 so that this magnet ring will be moved out of the annular space between the rings 409 and 410. A ring 414 fixed to the shaft 402 limits the movement of the clutch member 407 towards the right. The operation of the embodiment shown in Fig. 4 is the same as described in connection with the embodiment shown in Fig. 1.

From the above description it will be apparent that the permanent magnet 12 of Fig. 1, the rings 116 and 121 of Fig. 2 and the rings 221 and 321 of Fig. 3 form a shiftable magnetic part mounted on one of the members of the device for shifting movement in a direction substantially perpendicular to lines of magnetic force of the magnetic circuit means.

It is preferred to make the permanent magnet of the invention of a ceramic material including polyoxides of iron, barium, and other metals, this material having an extremely high retentivity which makes this magnetic material particularly suitable for the structure of the invention. This material is particularly suitable since it prevents demagnetizing of the permanent magnet when the magnetic circuit is broken.

It will be understood that each of the elements described above, or two or more together, may also find a useful application in other types of clutches or brakes differing from the types described above.

While the invention has been illustrated and described as embodied in a magnetic clutch or brake, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device having a pair of parts adapted to be releasably held immovably together such as a dry friction clutch or a dry friction brake, in combination, first and second members located adjacent each other and having end faces facing each other; shaft means slidably supporting one of said members for movement toward the other of said members to a position in which portions of said end faces engage each other; each of said members having an annular friction face constituted by a portion of the respective end face and forming a surface of revolution about the axis of said shaft means, said annular friction faces having equal inner and outer diameters respectively equally spaced from said axis; magnetic circuit means carried in part by said first member and in part by said second member for producing a magnetic circuit for magnetically attracting said members to each other and to bring the same in engaged condition, said magnetic circuit means including a permanent magnet element and at least one magnetizable element, at least one of said elements being shiftably supported by one of said members for shifting movement in a direction substantially perpendicular to lines of magnetic force of said magnetic circuit means, said shiftable element being shiftable on said one member to an operating position completing the circuit for the magnetic lines of force to bring said members in engaged condition and said attracting faces, said attracting faces en-operating position thereof to a rest position causing the lines of magnetic force to collapse for bringing said members to a disengaged condition, the magnetic circuit means carried by said first member and the magnetic circuit means carried by said second member having each at least one annular attracting face separate from said friction faces and constituting also part of said end faces, said attracting faces being respectively formed by congruent surfaces of revolution about said axis and being located opposite each other, said end faces engaging each other when said shiftable element is shifted to said operating position thereof only along said friction faces and said attracting faces, said attracting faces engage each other directly and without gap when said friction faces become engaged with each other and said attracting faces are formed by only a small portion of said end faces as to obtain at said attracting faces a maximum magnetic induction and a maximum attraction between said members; and means for moving said shiftable element of said circuit means between said operating position and said rest position thereof.

2. A device as defined in claim 1, in which the annular friction face of at least one of said members is formed on a portion of said member having a high coefficient of friction and in which said attracting faces are formed on portions of said members having a high magnetic permeability.

3. A device as defined in claim 1, in which said permanent magnet forms said shiftable element of said magnetic circuit means.

4. A device as defined in claim 1, in which said friction faces are spaced from said axis farther than said attracting faces.

5. In a device according to claim 1, said magnetic circuit means including a pair of magnetically conductive portions carried by said one member and defining between themselves a space along which said shiftable part is shiftable while slidably engaging said magnetically conductive portions.

6. A device as defined in claim 1, in which said magnetizable element forms said shiftable element of said magnetic circuit means.

7. In a device according to claim 5, said magnetically conductive portions extending beyond said shiftable part when the latter is in its operating position by a distance at least equal to the distance between the engaged position of said first member when the device is new and the engaged position of said first member when the device is fully worn, so that the device will continue to operate without adjustments during wear of the device.

8. In a device according to claim 5, said first and second members being of circular configuration and coaxial with each other, said magnetic portions being annular and defining between themselves an annular space, and said permanent magnet being in the form of a ring shiftable in said space and having lines of magnetic force extending radially toward the axis of said one member.

References Cited in the file of this patent

UNITED STATES PATENTS

| | | |
|---|---|---|
| 1,622,261 | Payne | Mar. 22, 1927 |
| 1,825,934 | Bing | Oct. 6, 1931 |
| 2,437,871 | Wood | Mar. 16, 1948 |
| 2,591,463 | Parker | Apr. 1, 1952 |
| 2,604,198 | Stephenson | July 22, 1952 |
| 2,605,875 | Stephenson | Aug. 5, 1952 |
| 2,635,723 | Feiertag | Apr. 21, 1953 |
| 2,722,617 | Clumen et al. | Nov. 1, 1955 |

FOREIGN PATENTS

| | | |
|---|---|---|
| 721,748 | Great Britain | Jan. 12, 1955 |
| 722,768 | Great Britain | Jan. 26, 1955 |
| 751,382 | Great Britain | June 27, 1956 |
| 185,173 | Austria | Apr. 10, 1956 |